United States Patent

Lace et al.

[15] 3,647,986

[45] Mar. 7, 1972

[54] TRACK INDICATOR FOR A TAPE PLAYER

[72] Inventors: Melvin A. Lace, Prospects Hts.; Laszlo N. Repay, Chicago, both of Ill.

[73] Assignee: Motorola, Inc., Franklin Park, Ill.

[22] Filed: Dec. 29, 1969

[21] Appl. No.: 888,396

[52] U.S. Cl. ............179/100.2MD, 179/100.2 CA, 274/4 A, 340/380

[51] Int. Cl. ..................G11b 27/34, G11b 21/08, G11b 5/36

[58] Field of Search ........179/100.2 MD, 100.2 CA, 100.2 Z; 274/11 A, 4 A; 340/278, 380

[56] References Cited

UNITED STATES PATENTS

| | | | |
|---|---|---|---|
| 2,422,143 | 6/1947 | Somers et al. | 179/100.2 Z |
| 3,532,347 | 10/1970 | Parsons | 179/100.2 CA |
| 3,477,725 | 11/1969 | Housman | 179/100.2 CA |
| 2,585,503 | 2/1952 | Schulze | 340/380 |
| 3,467,960 | 9/1969 | Hosker | 340/380 |
| 3,272,174 | 9/1966 | Pribonic | 340/380 |

*Primary Examiner*—Bernard Konick
*Assistant Examiner*—Jay P. Lucas
*Attorney*—Mueller & Aichele

[57] ABSTRACT

A track-indicating device for a cartridge tape player uses a single indicating lamp and a control lever which is moved to different positions with the positioning of the tape head to cause light from the lamp to be channeled to a particular one of a number of windows in an indicating panel corresponding to the track to be played at each position to which the head may be located to illuminate only that window of the indicating panel. In addition, a second control lever controls the channeling of light from the lamp to a stereo indicating window when a cartridge is removed from the player.

10 Claims, 5 Drawing Figures

INVENTORS.
MELVIN A. LACE
LASZLO N. REPAY
BY Mueller, Aichele & Rauner
ATTORNEYS.

TRACK INDICATOR FOR A TAPE PLAYER

BACKGROUND OF THE INVENTION

In the use of multitrack recording tapes having four or eight tracks, it is desirable to provide a means for indicating which of the several tracks on the tape is in position for recording or playback. One mechanism for accomplishing such indication uses an indicating lamp for each of the different tracks or channels, with a stepping switch activated by movement of the tape head positioning mechanism controlling the energization of the lamp corresponding to the selected track. Although mechanisms of this type are effective to provide the desired track indication it is desirable to reduce the number of indicating lamps required in order to simplify the assembly and to make it less expensive.

SUMMARY OF THE INVENTION

Accordingly, it is an object of this invention to provide an improved apparatus for indicating which of the tracks on a multitrack recording tape is being played or recorded upon.

It is an additional object of this invention to indicate by the use of a single light source the track of a multitrack recording tape which is being recorded upon or which is being reproduced by a playback mechanism.

It is another object of this invention to channel light from a single source of light to an indicating panel in accordance with the head position of the transducer head in a multitrack tape recorder/reproducer.

It is a further object of this invention to use the stereo indicator lamp of a stereo radio also having a multitrack tape recorder/reproducer associated therewith to function as the light source for a track-indicating panel in the tape recorder/reproducer.

In accordance with a preferred embodiment of this invention, an appropriate portion of an indicating panel, associated with a particular track to which the transducer head of a multitrack tape recording or reproducing mechanism is positioned, is illuminated from a source of light by completing a light channel from the source of light to the indicating portion by control apparatus operated in conjunction with the positioning of the tape transducer head.

DETAILED DESCRIPTION

Figures 1, 2, 3, 4, 5:
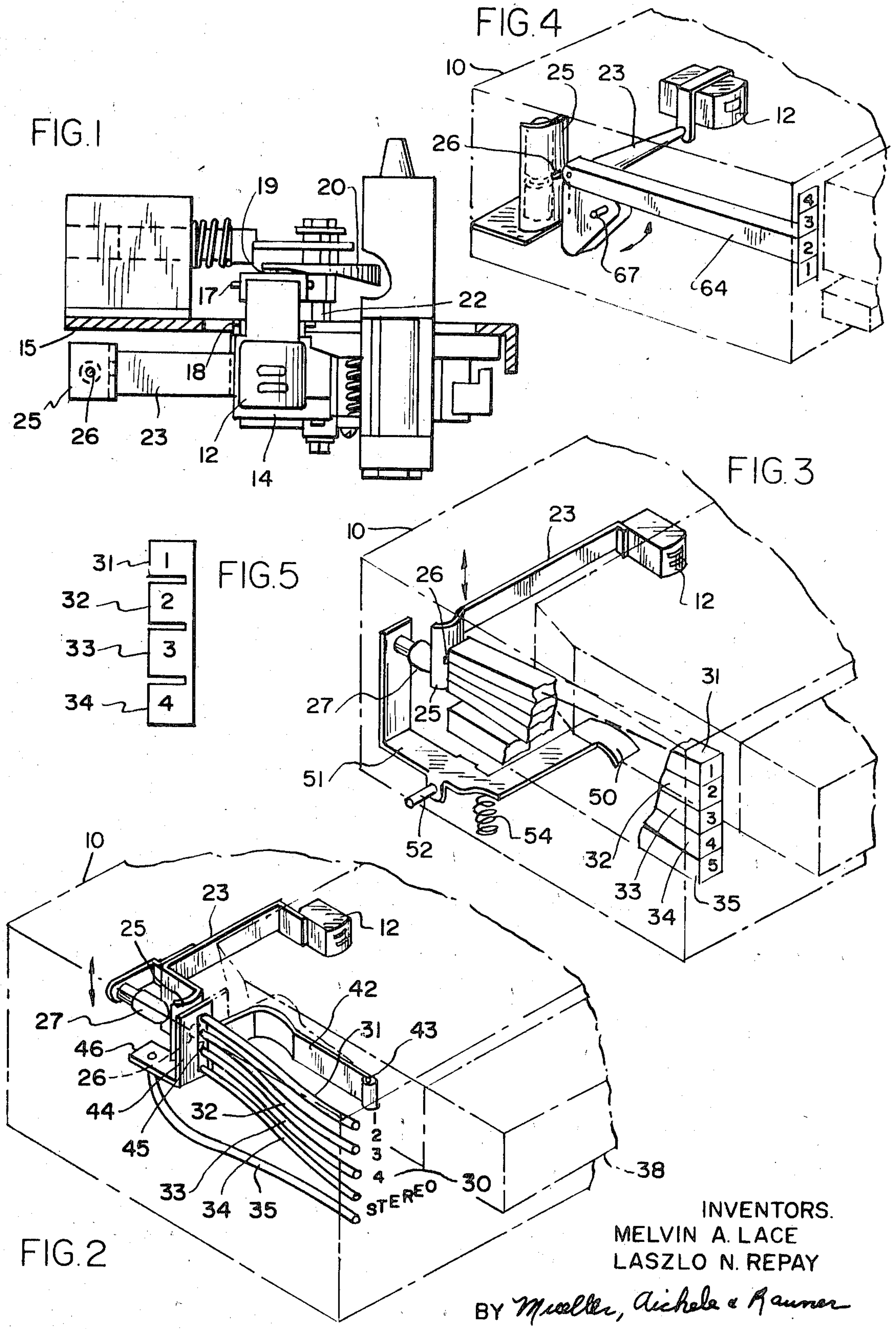
FIG. 1 is a side elevation view of a portion of a tape player/recorder mechanism illustrating a portion of a preferred embodiment of this invention.
FIG. 2 is a perspective view of a preferred embodiment of the invention.
FIG. 3 illustrates a variation of the mechanism shown in FIG. 2.
FIG. 4 is a perspective view of another embodiment of the invention.
FIG. 5 is a cross-sectional view of a portion of the mechanism shown in FIG. 3.

Referring now to the drawings in which like reference numbers are used in the different figures to designate the same or similar components, there is shown generally in dotted lines a portion 10 of a cartridge-type tape recorder/reproducer adapted to receive tape cartridges having multitrack tapes therein. In conjunction with the tape player 10 it is desirable to provide a track indicating device for indicating which of the tracks on the recording tape is being recorded upon or played back.

The tape player includes a magnetic tape transducer head 12 which is mounted in a head-positioning bracket 14 in order to provide for vertical adjustment of the tape head 12 (as viewed in FIG. 1) to record upon or reproduce the different tracks on the magnetic tape used with the tape player. The bracket 14 is movably mounted on a tape deck 15 by a pantograph, a portion of which includes a pair of pivot rods 17 and 18.

Integrally mounted with the head bracket 14 is a cam follower 19; and a spring, which is not shown, biases the pantograph and therefor the head bracket 14 and the cam follower 19 into contact with a multisurfaced cam 20. The cam 20 has a number of surfaces corresponding to the different positions to which the head 12 can be located. As shown in FIG. 1, the cam 20 has four different cam surfaces, each of which is associated with the four different sets of tracks on the magnetic tape (assuming that a standard eight-track stereo tape cartridge is to be played by the tape recorder/reproducer 10). The cam 20 in turn is mounted on a shaft 22 which is rotatably mounted on the tape deck 15. Upon rotation of the cam 20 at the end of one set of tracks on the tape or under the control of a manual positioning knob, the cam follower 19 moves the magnetic tape head assembly 14 and thus the head 12 against the spring bias of the pantograph to position the magnetic tape head 12 to a different set of tracks on the tape.

The tape player thus far described is of a standard construction, and includes a solenoid and pawl and rachet mechanism for rotating the cam 20, and further includes a capstan and a drive motor for rotating the capstan in order to record upon or reproduce tapes in a cartridge inserted into the tape player. Since these portions of the tape player are conventional, they are not described herein.

As shown in FIG. 1 the head bracket 14 also carries an extension or lever arm 23 for vertical positioning in accordance with the vertical positioning of the head bracket 14 and the tape head 12. On the other end of the lever arm 23, a light source in the form of a lamp 27 behind a shield 25, having an opening 26 therein, also is mounted so that as the lever arm 23 is positioned to different vertical positions in accordance with the position of the head bracket 14, the opening 26 is positioned to corresponding vertical positions accordingly.

Referring now to FIG. 2 there is shown a track-indicating panel 30 located on the front of the tape player housing 10 and having windows corresponding to the four sets of tracks on the cartridges to be used with the tape player. In addition, the panel 30 includes a fifth window marked "S" corresponding to a stereo indication when the tape player is used with an FM stereo radio receiver which may be operated when no cartridges are being played or recorded in the mechanism. Extending rearwardly from the indicating windows of the indicating panel 30 are five light tubes or light channels 31, 32, 33, 34 and 35, with one end of each of the tubes 31 and 35 terminating in the corresponding one of the five indicating windows in the panel 30. The tubes 31 and 35 are made of conventional light conducting material, and the opposite ends of the tubes 31 to 34 are located adjacent the vertical path of travel of the opening 26 in the shield or shutter 25.

The distance between the ends of each of the tubes 31 to 34 adjacent the window 26 in the shield or shutter 25 is equal to the vertical distance of travel of the tape head 12 for each of the different vertical positions to which the tape head 12 may be located by the operation of the cam 20. The size of the opening 26 in the shield 25 corresponds substantially to the size of the ends of each of the light tubes 31 to 34, so that only one of the light tubes 31 to 34 is illuminated with light for each of the different vertical positions of the shield 25. The indicating numerals on the indicating panel 30 correspond to the channels to which the tape head 12 may be located. The tube 35 terminates beneath the light bulb 27 so that it is illuminated whenever the bulb is energized.

Normally the light bulb 27 carried behind the shield 25 is nonenergized; but upon insertion of a cartridge 38, shown in dotted lines in FIG. 2, into the tape player mechanism, a microswitch (not shown) is closed to complete an energizing path to the bulb 27 from a suitable source indicated by the battery 41 to the bulb. Insertion of the cartridge 38 also causes the front edge of the cartridge to engage a cantilever spring member 42 which extends from a mounting post 43 located adjacent the side opening of the cartridge receiving chamber in the player 10. When a cartridge is inserted into the chamber, the spring 42 is moved from the dotted line location shown in FIG. 2 to the solid line location. This causes a vertical shutter member 44, carried by the free end of the spring 42, to move to position a vertical slot 45 opposite the ends of the light tubes 31 to 34; so that light from the bulb 27 may pass through the opening 26 and slot 45 to the respective one of the tubes 31 to 34. When the cartridge 38 is removed from the tape player, the spring 42 returns to the dotted line location, and the slot 45 is moved out of alignment with the ends of the light tubes 31 to 34 and the opening 26; so that the solid portion of the shutter 44 thereby blocks the passage of light to the tubes 31 to 34.

It is to be noted that the light tube 35 terminates in a rearwardly extending member 46 located beneath the bulb 27; so that light from the bulb 27 continuously is permitted to impinge upon the end of the light tube 35. Thus, the light tube 35 provides an indication on the panel 30 whenever the bulb 27 is illuminated. When no cartridge 38 is present in the tape player, control of the illumination of the light tube 35 may be effected by the stereo lamp driver circuit commonly employed with the radio receiver with which the tape player 10 is associated. Thus, when a stereo station is being received by the receiver a switch (not shown) may be closed to provide current to the bulb 27, thereby illuminating the light tube 35 causing the "S" stereo indication to be illuminated on the channel indicator panel 30.

In FIG. 3 there is shown a variation of the mechanism shown in FIG. 2 in which the lever arm 23 moves the shutter 25 including the hole 26 between the ends of the light tubes 31 to 35 and a light source. When a cartridge 38 is inserted into the cartridge-receiving chamber of the tape player shown in FIG. 3, the lower edge of the cartridge engages a camming surface 50 on a lever 51 to rock the lever 51 clockwise about a pivot 52, mounted in the side of the housing for the tape player, against the action of a compression coil spring 54. This causes the light bulb 27 to be placed in the position shown in solid lines in FIG. 3. When the cartridge 38 is removed from the tape-receiving chamber, the spring 54 causes the lever 51 to be rocked counterclockwise, dropping the lamp 27 to a position opposite the end of the stereo light tube 35, which is separated from the light tubes 31 to 34 used to indicate the four head positions.

In FIG. 3 the light tubes 31 to 34 may be formed from a single piece of light-conducting material, with the separation between the different tubes being effected by moulding or cutting grooves through most of the distance between each of the different light tubes, as most clearly seen in FIG. 5, which is a cross-sectional view of the tubes 31 to 34 shown in FIG. 3. From an examination of FIG. 5, it may be seen that the four light tubes 31 to 34 are formed from a single piece of material by cutting or forming three slits extending horizontally across the greater portion of the width of the material. In order to minimize reflection of light from one of the tubes to another, the surfaces of the slits preferably are frosted or roughened, as well as the surface on the right-hand side shown in FIG. 5.

The operation of the mechanisms shown in FIGS. 2 and 3 are substantially the same, and it should be understood that light tubes of the type shown in FIG. 2 could be used in the apparatus of FIG. 3, and vice versa.

In FIG. 4 there is shown another variation of the channel indicating panel using only a single light tube 64, one end of which is adjacent the channel-indicating panel 30 and is free to move between each of the different channel positions on the channel indicating panel. The other end of the light tube 64 is located adjacent a window 26 in a stationary shutter 25, behind which is located a stationary light source in the form of a single lamp. The light tube 64 is pivotally mounted intermediate its ends on a pivot 67 which may be attached to a side of the housing of the tape player mechanism 10. The lever arm 23 corresponding to the lever arm 23 shown in FIGS. 1, 2 and 3 is attached to the tape head positioning bracket 14 in the same manner as shown in FIGS. 1, 2 and 3, but causes the light tube 64 to pivot about the pivot 67 under control of the vertical movement of the lever 23.

Thus, for each different vertical location of the transducer head 12, the light tube 64 is rotated to a different position opposite a different one of the indicating windows in the indicating panel 30. It should be noted that the indicating windows corresponding to the four channels which can be played or recorded upon in the cartridge 38 are numbered in the reverse order from the numbering provided in FIGS. 2 and 3. This is done since downward movement of the tape head 12 in FIG. 4 causes the end of the light tube 64 adjacent the indicating panel to move upwardly, whereas downward movement of the tape head 12 in FIGS. 2 and 3 causes the light channels 31 to 35 to be illuminated in a downward order. A stereo or "S" indication also could be provided with the apparatus shown in FIG. 4 and would be operated in the same manner as the illumination of the light tube 35 of FIGS. 2 and 3.

The light tubes 31 to 35 and 64 which have been illustrated may be made of lucite or of fiber optic materials, or may be made from any other suitable light conducting material. The tubes could be merely hollow tubes of opaque material to prevent the transmission of light from one tube to another. If hollow tubes of this type are used, it would be preferable to have the inside surfaces of the tubes coated with reflective material in order to maximize the amount of light transmitted by the tubes.

We claim:

1. In a multitrack tape recording or reproducing device for receiving a tape and having a transducer head which is positioned adjacent predetermined ones of the tracks on the tape under control of a head positioning device, a head position indicating apparatus including in combination:

an indicating panel with a plurality of fixed indicating portions corresponding to different head positions to indicate the track to which the head is positioned;

a source of light;

light channel means between the source of light and the indicating panel;

first control means positioned for movement with the head and cooperating with the light channel means to cause light from the source of light to be channeled by the channel means to a selected indicating portion of the panel corresponding to the head position; and second control means for preventing the channeling of light by the channel means when no tape is in said recording/reproducing device and for enabling the channeling of light from the source of light by the channel means when tape is received by the recording/reproducing device.

2. In a multitrack tape recording or reproducing device for receiving tape cartridges and having a transducer head which is positioned adjacent predetermined ones of the tracks on the tape in such cartridges under control of a head positioning device, a head position indicating apparatus including in combination:

an indicating panel with a plurality of fixed indicating portions corresponding to different head positions to indicate the track to which the head is positioned;

a source of light;

light channel means between the source of light and the indicating panel;

a lever carrying the source of light normally biased to a first position so that substantially no light is channeled by the channel means to the indicating panel, the lever having a camming portion for engagement by a tape cartridge to move the lever to a second position where light is channeled by the light channel means to the indicating portions of the indicating panel; and control means positioned for movement with the head and cooperating with the light channel means to cause light from the source of light to be channeled by the channel means to a selected indicating portion of the indicating panel corresponding to the head position.

3. The combination according to claim 2 further including a further light channel and a further indicating portion on the indicating panel, the further light channel being between the further indicating portion and the position of the light source when the lever is in the first position.

4. In a multitrack tape recording or reproducing device for receiving a tape and having a transducer head which is positioned adjacent predetermined ones of the tracks on the tape under control of a head positioning device, a head position indicating apparatus including in combination:

an indicating panel with a plurality of fixed indicating portions corresponding to different head positions to indicate the track to which the head is positioned;

a source of light;

a single light channel movably mounted between the source of light and the indicating portions of the indicating panel; and control means positioned for movement with the head for moving the light channel to conduct light from the source of light to a different indicating portion of the indicating panel for each different head position.

5. The combination according to claim 4 wherein the light channel is a light tube pivotally positioned between the source of light and the indicating portions of the indicating panel and wherein the control means is a lever arm coupled for movement with the head positioning mechanism and coupled to the light channel means for pivoting the same to conduct light from the source of light to the different indicating portions in accordance with the head position.

6. In a multitrack tape recording or reproducing device for receiving a tape and having a transducer head which is positioned adjacent predetermined ones of the tracks on the tape under control of a head positioning device, a head position indicating apparatus including in combination:

an indicating panel with a plurality of fixed indicating portions corresponding to different head positions to indicate the track to which the head is positioned;

a source of light;

a plurality of light channels corresponding to the number of indicating portions in the indicating panel and each terminating in a different indicating portion; and an extension lever carried by the head positioning mechanism, with the source of light mounted on the extension lever adjacent one end of the light channels so that the source of light is positioned by the movement of the extension lever opposite one end of a different light channel for each different position of the head.

7. The combination according to claim 6 wherein the source of light includes a light bulb at a fixed location relative to the extension lever, and further includes a shutter on the extension lever between the light bulb bulb and the light channel for permitting light from the light bulb to impinge upon the end of only one of the plurality of light channels corresponding to the position of the head.

8. In a multitrack tape recording or reproducing device for receiving tape for recording or reproduction and having a transducer head which is positioned adjacent predetermined ones of the tracks under control of a head positioning device, a head position indicating apparatus including in combination:

an indicating panel with a plurality of fixed indicating portions corresponding to different head positions to indicate the track to which said head is positioned;

a source of light;

light channel means between the source of light and the indicating panel;

first control means positioned for movement with the head and cooperating with the light channel means to permit light from the source of light to be channeled by the channel means to a selected indicating portion of the indicating panel corresponding to the head position; and second control means responsive to the receipt of tape by the tape recording or reproducing device for enabling the first control means for controlling the channeling of light from the source of light to the indicating panel.

9. The combination according to claim 8 wherein the second control means includes a lever carrying a shutter means with the shutter means being in a light blocking position between the indicating panel and the source of light when no tape is in the recording/reproducing device, the lever having a camming portion for engagement when tape is received by the recording/reproducing device to move the lever to a second, light passing position.

10. The combination according to claim 9 further including a further light channel and a further indicating portion on the indicating panel, the further light channel being located between the source of light and the further indicating portion and being unaffected by the first and second control means.

* * * * *